US008842781B2

(12) United States Patent
Clevorn et al.

(10) Patent No.: US 8,842,781 B2
(45) Date of Patent: Sep. 23, 2014

(54) DEVICE AND METHOD FOR SELECTING A PATH FROM AN ESTIMATED DELAY PROFILE OF A RADIO SIGNAL

(75) Inventors: Thorsten Clevorn, Duesseldorf (DE); Alper Ceylan, Duisburg (DE)

(73) Assignee: Intel Mobile Communications GmbH, Neubiberg (DE)

( * ) Notice: Subject to any disclaimer, the term of this patent is extended or adjusted under 35 U.S.C. 154(b) by 1018 days.

(21) Appl. No.: 12/705,670

(22) Filed: Feb. 15, 2010

(65) Prior Publication Data

US 2011/0200075 A1    Aug. 18, 2011

(51) Int. Cl.
| H04B 1/00 | (2006.01) |
| H04L 27/06 | (2006.01) |
| H04B 1/7117 | (2011.01) |
| H04B 17/00 | (2006.01) |
| H04B 1/7113 | (2011.01) |
| H04B 7/08 | (2006.01) |

(52) U.S. Cl.
CPC .......... *H04B 17/0047* (2013.01); *H04B 1/7117* (2013.01); *H04B 7/0857* (2013.01); *H04B 17/0045* (2013.01); *H04B 1/7113* (2013.01)
USPC ........... 375/340; 375/316; 375/347; 375/130; 375/136

(58) Field of Classification Search
USPC ......... 375/130, 135–137, 140–150, 219, 295, 375/316, 222, 260, 340, 346, 347, 349, 350, 375/299
See application file for complete search history.

(56) References Cited

U.S. PATENT DOCUMENTS

| 7,283,578 | B2 | 10/2007 | Lin et al. | |
| 8,064,497 | B2* | 11/2011 | Jonsson et al. | 375/148 |
| 2006/0017534 | A1 | 1/2006 | Accoto et al. | |
| 2006/0176937 | A1* | 8/2006 | Bottero et al. | 375/147 |
| 2006/0251153 | A1 | 11/2006 | Noerklit | |
| 2008/0051046 | A1* | 2/2008 | Ruckriem | 455/132 |
| 2008/0212603 | A1* | 9/2008 | Chiu et al. | 370/430 |
| 2010/0103047 | A1* | 4/2010 | Tsunehara et al. | 342/387 |
| 2011/0026577 | A1* | 2/2011 | Primo et al. | 375/232 |

OTHER PUBLICATIONS

3rd Generation Partnership Project; Technical Specification Group Radio Access Networks; UE Radio Transmission and Reception (FDD); (Release 5); Annex B (normative): Propagation Conditions; 2002-2003; pp. 59-61.

* cited by examiner

*Primary Examiner* — Sam K Ahn
*Assistant Examiner* — Linda Wong
(74) *Attorney, Agent, or Firm* — Eschweiler & Associates, LLC (57) ABSTRACT

A device includes a delay profile estimator to estimate a delay profile of multiple paths of a radio signal, wherein the delay profile indicates signal powers of the multiple paths as a function of time delay. The device further includes a path selector to select a path from the delay profile if the path has a signal power higher than a threshold. The threshold has a first threshold value in a first section of the delay profile which is higher than a second threshold value in a second section of the delay profile.

25 Claims, 7 Drawing Sheets

DEVICE AND METHOD FOR SELECTING A PATH FROM AN ESTIMATED DELAY PROFILE OF A RADIO SIGNAL

FIELD

This invention relates to a device and a method for selecting paths from an estimated delay profile of a radio signal depending on a threshold.

BACKGROUND

In wireless communications multi-path propagation is a phenomenon that results in radio signals reaching the receiving antenna by two or more paths. Multi-path propagation may be caused by ionosphere reflection and refraction or by reflection from terrestrial objects such as mountains and buildings. Multi-path propagation may produce errors in the receiver due to undesired constructive and destructive interference and phase shifting of the received radio signals. The resulting intersymbol interferences degrade the quality of communications.

Radio receivers, e.g. UMTS modems or Rake receivers, estimate a multi-path profile of the radio channel to compensate for the undesired effects of multi-path propagation. Weak paths of the multi-path signals estimated by the radio receiver however generate more noise than they help in decoding and thus should be rejected. Field tests have shown that weak paths close to a strong path exhibit a lot of interference from the nearby strong path and thereby degrade the performance of the radio receiver. The receiver may increase a threshold for selecting paths from the multi-path profile to exclude the weak paths from further processing. Increasing the threshold, however, decreases the accuracy of the radio receiver as independent paths which are not interfered by nearby paths are suppressed too.

For these and other reasons there is a need for an improvement in radio receivers that estimate a multi-path profile.

DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

As employed in this Specification, the terms "coupled" and/or "electrically coupled" are not meant to mean that the elements must be directly coupled together; intervening elements may be provided between the "coupled" or "electrically coupled" elements.

Devices including delay profile estimators for estimating a delay profile of multiple paths of a radio signal and path selectors for selecting paths from the delay profile are described below.

A delay profile (also known as a power delay profile) gives the intensity of a signal received through a multi-path channel as a function of time delay. The time delay is the difference in travel time between multi-path arrivals. The abscissa is in units of time and the ordinate is usually in decibels. It can be measured empirically and can be used to extract certain channel parameters such as the delay spread.

In one embodiment the devices may be designed for implementing the UMTS (Universal Mobile Telecommunications System) standard, e.g. one of the Release 99, 4, 5, 6, 7, 8, 9, 10 and higher versions of the UMTS standard. The devices may implement the HSPA (High Speed Packet Access) standard in downlink (HSDPA) as well as in uplink (HSUPA) direction. The devices may be designed to implement the HSPA+ (Evolved HSPA) standard, the CDMA (Code Division Multiple Access) standard, the WCDMA (Wideband CDMA) standard, the LTE (Long Term Evolution) mobile communications standard, the E-UTRAN (Evolved Universal Terrestrial Radio Access Network) standard, the HSOPA (High Speed Orthogonal Frequency Division Multiplex Packet Access) standard or the Super 3G standard defined by 3GPP (Third Generation Partnership Project) standardization organization. UMTS using WCDMA supports maximum theoretical data transfer rates of up to 84 Mbit/s using HSDPA although users in deployed networks can expect data transfer rates of about 384 kbit/s for R99 handsets and 7.2 Mbit/s for HSDPA handsets in the downlink connection.

The devices may further be designed to implement the WiMAX (Worldwide Interoperability for Microwave Access) standard or the IEEE (Institute of Electrical and Electronics Engineers) 802.16 standard. The devices described in the following may also be designed to implement other standards, e.g. Bluetooth, IrDA (Infrared Data Association), CDMA2000, WiFi (Wireless Fidelity), GSM (Global System for Mobile Communication), EDGE (Enhanced Data Rates for GSM Evolution), GPRS (General Packet Radio Service).

The devices described below may depend on parameters defined by the CDMA standard, e.g. the chip rate. In CDMA a chip is a pulse of a direct-sequence spread spectrum (DSSS) code, such as a pseudo-noise code sequence used in direct-sequence code division multiple access (CDMA) channel access techniques. In a binary direct-sequence system, each chip is typically a rectangular pulse of +1 or −1 amplitude, which is multiplied by a data sequence (similarly +1 or −1 representing the message bits) and by a carrier waveform to make the transmitted signal. The chips are therefore just the bit sequence out of the code generator; they are called chips to avoid confusing them with message bits. The chip rate of a code is the number of pulses per second (chips per second) at which the code is transmitted or received. The chip rate is larger than the symbol rate, meaning that one symbol is represented by multiple chips. The ratio is known as the spreading factor (SF) or processing gain.

The symbol rate is the number of symbol changes (signaling events) made to the transmission medium per second using a digitally modulated signal, e.g. modulated by QAM or QPSK. A symbol is a state or significant condition of the communication channel that persists for a fixed period of time. A sending device places symbols on the channel at a fixed and known symbol rate, and the receiving device has the job of detecting the sequence of symbols in order to reconstruct the transmitted data. In CDMA systems the term symbol may refer to one information bit or a block of information bits that are modulated using a modulation scheme, for example QAM, before the CDMA spreading code is applied. Thus, the symbol rate is equal to or lower than the chip rate.

The devices may include integrated circuits or passives. The integrated circuits may be manufactured by different technologies and may, for example, be designed as logic integrated circuits, analog integrated circuits, mixed signal integrated circuits, or memory circuits.

The devices described below may be implemented in Rake receivers, G-Rake (Generalized-Rake) receivers, equalizers or in radio receivers which exploit multi-path information of the received radio signal.

Radio receivers are electronic circuits that receive radio signals and use electronic filtering to compensate for effects of a radio channel disturbing the transmission of the radio signal. For the compensation of the distortion due to the radio channel the radio receiver may estimate channel parameters of the radio channel to equalize the received radio signals by applying the inverse channel parameters to the received radio signals.

Radio signals are radio frequency signals which are radiated by a radio transmitter (sender) with a radio frequency (RF) in the range of about 3 Hz to 300 GHz. This range corresponds to the frequency of alternating current electrical signals used to produce and detect radio waves. RF usually refers to oscillations in electrical circuits.

Equalizers are devices for the purpose of altering the frequency response characteristics of a system. They may use passive or active electronic components or digital algorithms to influence the frequency characteristics of the system. Radio channels in mobile radio systems are usually multipath fading channels, which cause intersymbol interference (ISI) in the received signal. To remove ISI from the signal, different types of equalizers can be used. Detection algorithms based on trellis search, e.g. MLSE (Maximum-Likelihood Sequence Estimation) or MAP (Maximum A-posteriori Probability), offer a good receiver performance but exhibit a high computational effort. For reducing the computational complexity approximating algorithms which exhibit reasonable computational complexity, such as Rake, G-Rake, LMMSE (Linear Minimum Mean Squared Error), decorrelator/zero-forcer, SIC/PIC (Successive Interference Cancellation/Parallel Interference Cancellation), sphere-decoders or list-decoders are utilized.

A Rake receiver, a G-Rake receiver or an equalizer can be utilized to counter the effects of multipath fading. This can be achieved by using several sub-equalizers or "fingers", that is, several correlators each assigned to a different multi-path component. Each finger independently equalizes a single multi-path component, at a later stage the contribution of all fingers are combined in order to make the most use of the different transmission characteristics of each transmission path. This results is a higher signal-to-noise ratio in a multi-path environment.

Rake receivers and equalizers require knowledge on the delay profile of the channel which includes available multi-paths or multiple paths indicating the different spreading paths of the signal energy. The delay profile, also designated as multi-path profile, can be provided by a delay profile estimator implemented within the Rake receiver/equalizer or as a pre-processing stage to the Rake receiver/equalizer. For an adequate or optimal selection of the fingers representing the multi-path signal energies, a path selector may be used. The path selector selects paths from the delay profile estimated by the delay profile estimator and provides the selected paths to the Rake/G-Rake receiver or to the equalizer to improve the operation of the Rake receiver/equalizer.

By using the Rake receiver, the G-Rake receiver or the equalizer, different paths with different delays can be effectively combined to obtain the path diversity gain. Due to narrow transmission pulses and a large transmission bandwidth of the radio channel, the resulting ISI and a long delay spread in the characterization of the radio channel may be overcome by using the Rake receiver.

The equalizer may include a combined adaptive Rake/G-Rake and equalizer structure, referred to as MMSE (Minimum Mean Square Error) algorithm to reduce multi-path destruction and ISI instead of a usual maximum ratio combining (MRC) Rake receiver.

Figure 1:
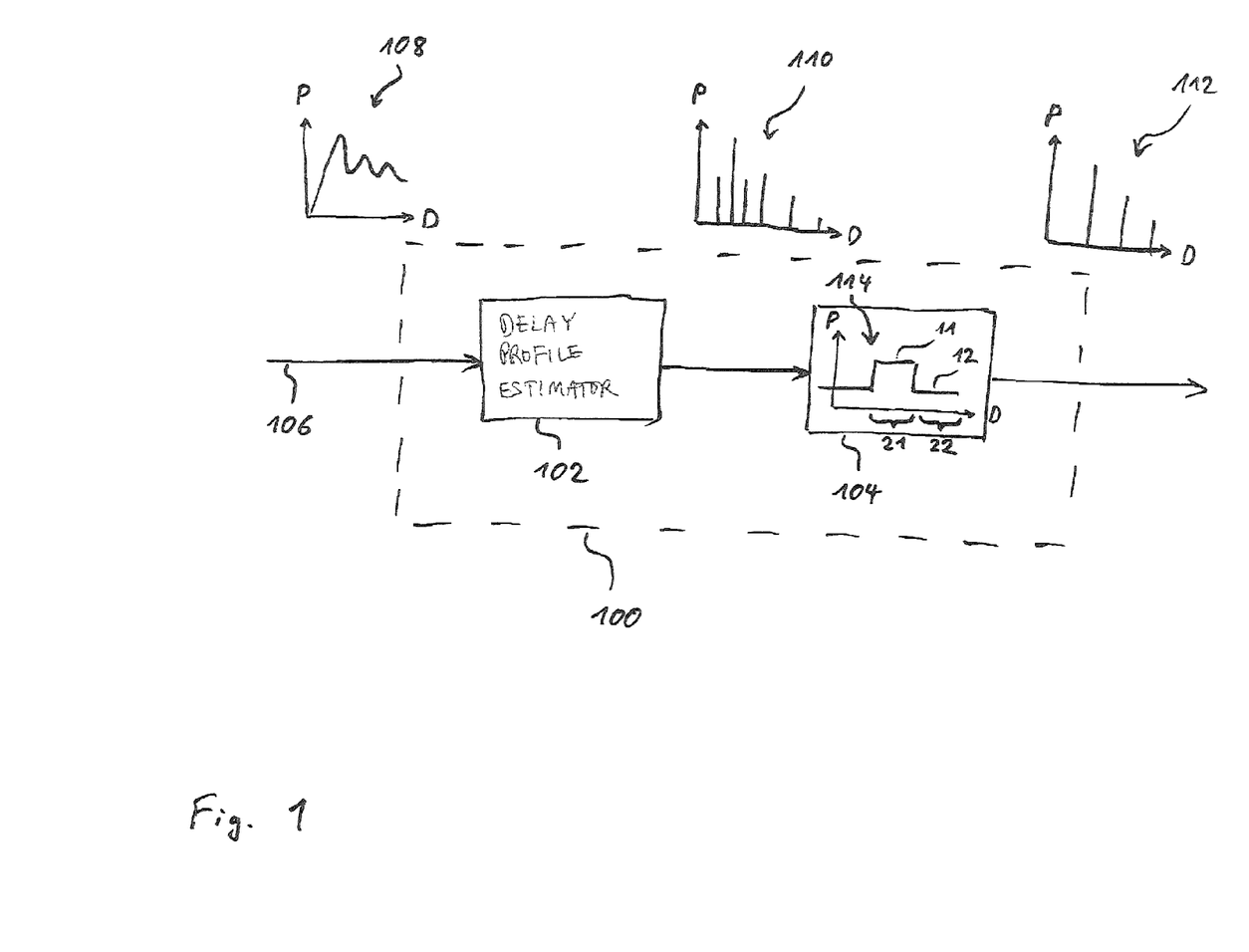
FIG. 1 schematically illustrates a device according to one embodiment.

FIG. 1 schematically illustrates a device 100 according to one embodiment. The device 100 includes a delay profile estimator 102 and a path selector 104. The delay profile estimator 102 receives a radio signal 106 which may be a multi-path signal comprising multiple path signals as indicated by the delay profile 108.

The delay profile 108 shows the signal power P of the multiple paths (multi-paths) of the radio signal 106 as a function of time delay D. In the delay profile 108 depicted in FIG. 1 three multiple paths are illustrated. The time delay D is the difference in travel time between multi-path arrivals. The abscissa D is in units of time and the ordinate P may be in decibels, for example.

The delay profile estimator 102 estimates the delay profile 108 of the radio signal 106 and provides an estimated delay profile 110 containing estimates of the multiple paths of the original delay profile 108. The estimated delay profile 110 may illustrate estimated signal powers P of the radio signal 106 versus time delay D. The estimated delay profile 110 may be stored by the delay profile estimator 102 as a table including numbers representing the signal powers and numbers representing the time delays. In one embodiment the table may have the form of a list, e.g. a concatenated list, or of another suitable digital representation.

The path selector 104 selects one or more paths from the estimated delay profile 110 estimated by the delay profile estimator 102 and provides a selected delay profile 112 containing selected signal powers P of the radio signal 106 versus time delay D. The selected delay profile 112 may also be stored as a table or a list or in another suitable representation.

The path selector 104 uses a threshold 114 to select paths from the estimated delay profile 110 by selecting paths having a signal power that is above the threshold 114 and suppressing those paths having a signal power that is below the threshold 114. The threshold 114 has a first threshold value 11 in a first section 21 of the (estimated) delay profile 110 and a second threshold value 12 in a second section 22 of the delay profile 110. In one embodiment the first threshold value 11 is higher According to one embodiment, Table 1 illustrates delay profiles (path profiles) defined by 3GPP (Third Generation Partnership Project) for testing radio receivers in the technical specification 3GPP TS 25.101 "UE Radio transmission and Reception (FDD)". The table defines mean values for different strong and weak paths. Case 1 defines a strong path with a relative delay of 0 ns and a relative mean power of 0 dB and a weak path with a relative delay of 976 ns and a relative mean power of −10 dB. The relative delay of 976 ns corresponds to about 3.75 Tc, wherein Tc is the chip length. To pass the "Case 1" test a radio receiver should detect the weak path of mean signal power −10 dB at 976 ns.

TABLE 1 path profiles from 3GPP TS25.101 for Releases 99 and higher

| Case 1 | | Case 2 | | Case 3 | | Case 4 | | Case 5 (Note 1) | | Case 6 | |
|---|---|---|---|---|---|---|---|---|---|---|---|
| Speed for Band I, II, III, IV, IX and X: 3 km/h | | Speed for Band I, II, III, IV, IX and X: 3 km/h | | Speed for Band I, II, III, IV, IX and X: 120 km/h | | Speed for Band I, II, III, IV, IX and X: 3 km/h | | Speed for Band I, II, III, IV, IX and X: 50 km/h | | Speed for Band I, II, III, IV, IX and X: 250 km/h | |
| Speed for Band V, VI and VIII: 7 km/h | | Speed for Band V, VI and VIII: 7 km/h | | Speed for Band V, VI and VIII: 282 km/h (Note 2) | | Speed for Band V, VI and VIII: 7 km/h | | Speed for Band V, VI and VIII: 118 km/h | | Speed for Band V, VI and VIII: 583 km/h (Note 2) | |
| Speed for Band VII: 2.3 km/h | | Speed for Band VII: 2.3 km/h | | Speed for Band VII: 92 km/h | | Speed for Band VII: 2.3 km/h | | Speed for Band VII: 38 km/h | | Speed for Band VII: 192 km/h | |
| Relative Delay [ns] | Relative mean Power [dB] | Relative Delay [ns] | Relative mean Power [dB] | Relative Delay [ns] | Relative mean Power [dB] | Relative Delay [ns] | Relative mean Power [dB] | Relative Delay [ns] | Relative mean Power [dB] | Relative Delay [ns] | Relative mean Power [dB] |
| 0 | 0 | 0 | 0 | 0 | 0 | 0 | 0 | 0 | 0 | 0 | 0 |
| 976 | −10 | 976 | 0 | 260 | −3 | 976 | 0 | 976 | −10 | 260 | −3 |
| | | 20000 | 0 | 521 | −6 | | | | | 521 | −6 |
| | | | | 781 | −9 | | | | | 781 | −9 | than the second threshold value 12. The first section 21 and the second sections 22 are sections of time delay D.

In one embodiment the threshold 114 may be pre-determined such that the first section 21 is arranged around a first reference path of the delay profile 110, and such that a range of the first section 21 has a pre-determined length. The first reference path may be, for example, the strongest path of the delay profile 110 which signal power may be normalized to 0 dB. In one embodiment the length may result from evaluation of field tests which indicate typical multi-path profiles. It may be selected such that artifacts or interferences caused by the strongest path are suppressed by the threshold 114 while independent paths pass the threshold 114.

Field tests have shown that artifacts or interferences of the strong paths are located nearby the strong paths having a distance below about three times the chip length Tc. A threshold 114 having a first section 21 arranged around the strongest path with a first threshold value 11 below the signal power of the strongest path and above the signal power of weaker paths and having a second section 22 contiguous to the first section 21 with a second threshold value 12 lower than the first threshold value 11, may discriminate between weak paths resulting from artifacts or interferences of the strong paths and weak paths which are independent multi-paths of the radio signal 106. By suppressing the artifacts or interferences in the estimated delay profile 110 the device 100 is able to increase the processing accuracy in a Rake receiver/equalizer receiving the selected delay profile 112.

Case 3 defines a strong path with a relative delay of 0 ns and a relative mean power of 0 dB and three weaker paths with relative delays of 260 ns, 521 ns and 781 ns and corresponding relative mean powers of −3 dB, −6 dB and −9 dB. The relative delays of 781 ns, 521 ns and 260 ns correspond to about 3 Tc, 2 Tc and 1 Tc. To pass the "Case 3" test a radio receiver should detect the strong path and all three weaker paths.

Figure 2:
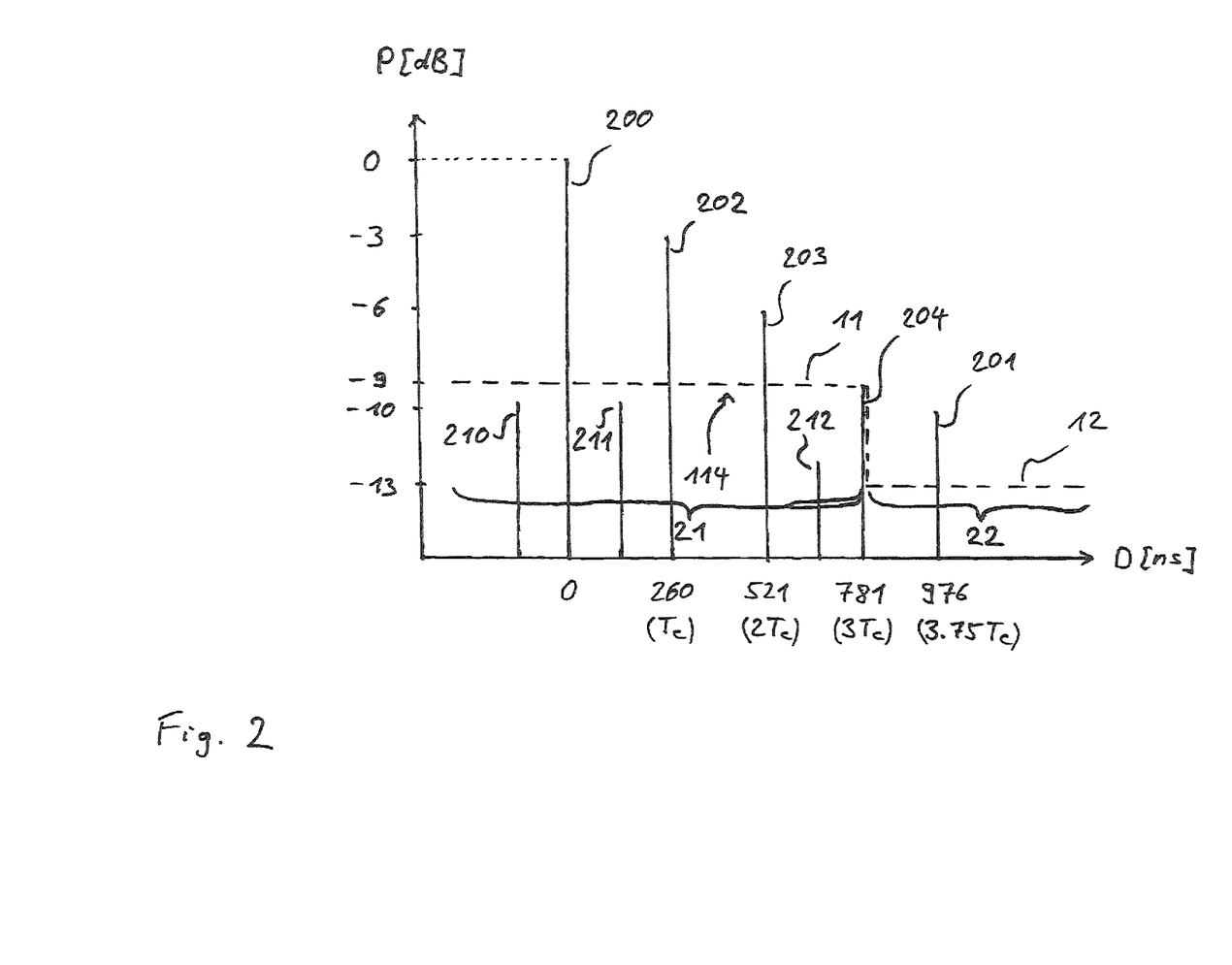
FIG. 2 schematically illustrates a delay profile according to the 3GPP TS 25.101 specification and a threshold of a device according to one embodiment.

FIG. 2 depicts a delay profile according to 3GPP TS 25.101 and a threshold 114 according to an embodiment. The device 100 according to an embodiment may use the threshold 114 illustrated in FIG. 2 with a first threshold value 11 of −9 dB in a first section 21 ranging around the reference path 200 (which is the strong path at relative delay D of 0 ns and relative mean power P of 0 dB) and with a second threshold value 12 of −13 dB in a second section 22 which ranges contiguous to the first section 21.

FIG. 2 depicts the strong path 200 (reference path, 0 dB/0 ns) corresponding to Table 1 and seven weak paths 201, 202, 203, 204, 210, 211, and 212. The weak path 201 (−10 dB/976 ns) corresponds to the "Case 1" test of Table 1 and the weak paths 202 (−3 dB/260 ns), 203 (−6 dB/521 ns) and 204 (−9 dB/781 ns) correspond to the "Case 3" test of Table 1. Additional three weaker paths 210, 211 and 212 represent artifacts which were caused by the strong path 200. By using the threshold 114 which transitions between the first section 21 and the second section 22, set to a threshold transition delay of about three times the chip length (3 Tc), both tests "Case 1" and "Case 3" are passed. The threshold 114 suppresses the artifacts 210, 211, 212 nearby the strong path 114 while the weak paths 201, 202, 203 and 204 originating from independent multi-paths of the radio signal 106 are allowed to pass the path selector 104. With a constant threshold of −13 dB such a separation between weak independent multi-paths and artifacts would not have been possible.

In one embodiment the threshold 114 includes two sections 21 and 22. The first section 21 can be arranged symmetrically or unsymmetrically around the reference path 200. A second transition (not illustrated in FIG. 2) between first section 21 and second section 22 can be set in the range of negative time delays to e.g. −3 Tc for a symmetrical arrangement or to e.g. −2 Tc for an unsymmetrical arrangement, for example. The second transition may separate the first section 21 from a further section (in the range of negative time delays) which has the same second threshold value 12 as the second section 22, it may be a continuation of the second section 22. The further section may also be a section different from the second section 22 having a different threshold value. Further sections having different thresholds may also be arranged in the range of positive time delays successive to the second section 22, in a range inside the first section 21 or inside the second section 22 or between the first 21 and the second 22 section. All such alternative embodiments are contemplated as falling within the scope of the present invention.

In one embodiment the threshold 114 is constant at −9 dB in the first section 21 and constant at −13 dB in the second section 22. The threshold 114 does not need to be constant, any shape can be chosen, for example a shape of a Sin(x)/x function, a raised cosine or any other filtering function. The threshold 114 may be represented as a table with rows representing the time delay D and columns representing the signal power P or vice versa. The transition between the first section 21 and the second section 22 may be a seamless transition or a gradual or steplike transition, for example.

Figure 3A:
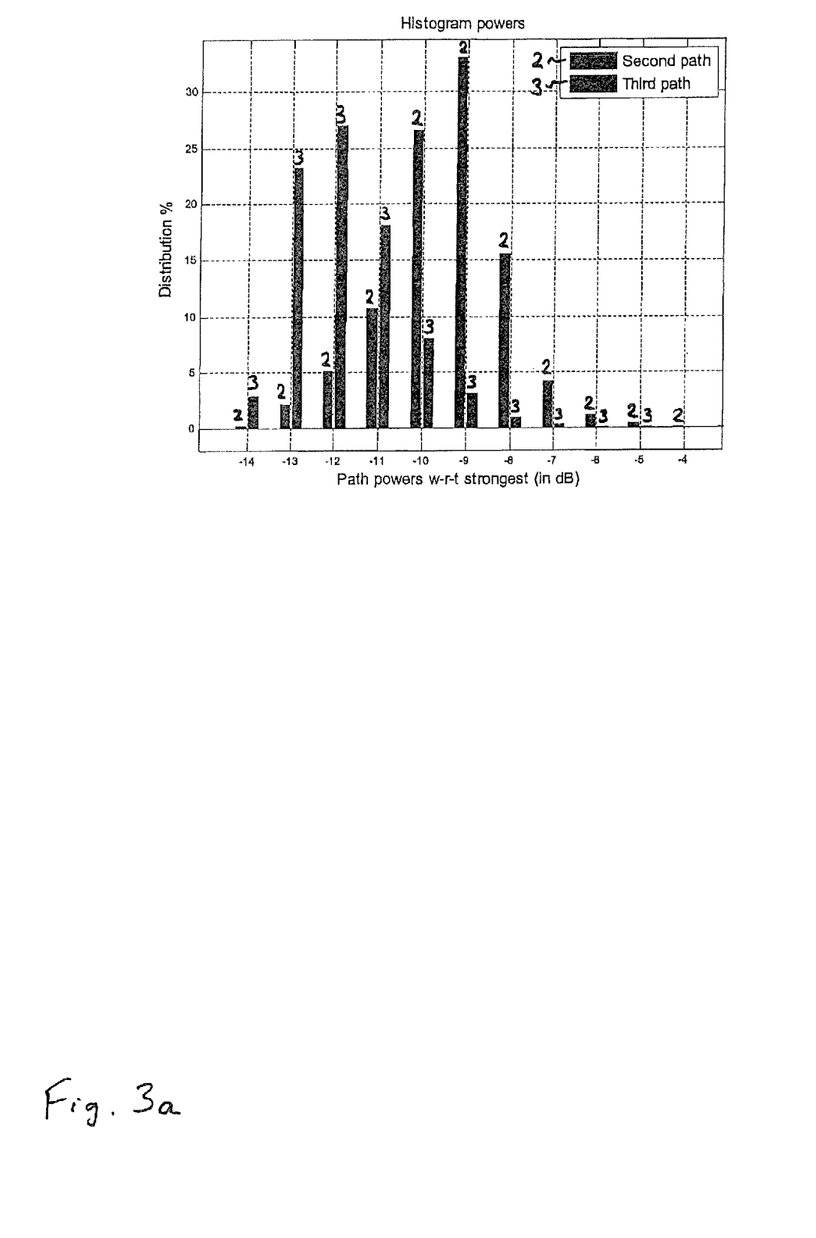
FIG. 3a depicts a histogram illustrating an exemplary distribution of path power of a UMTS delay profile observed in the field.
Figure 3B:
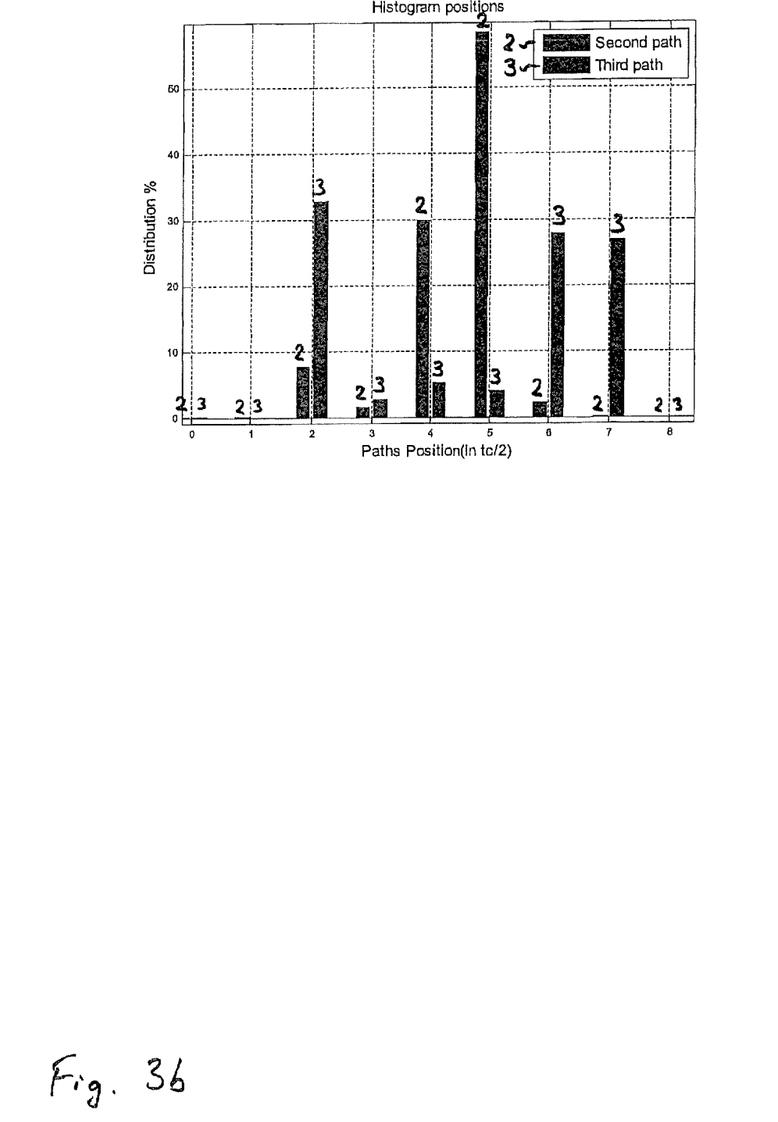
FIG. 3b depicts a histogram illustrating an exemplary distribution of time delays of a UMTS delay profile observed in the field.

In one embodiment, finding adequate or optimal values for the first threshold value 11 and the second threshold value 12 may be achieved by evaluating results of field tests. FIGS. 3a and 3b illustrate results from such field tests. Alternatively, other manners of finding or otherwise establishing adequate or optimal values may be employed according to alternative embodiments of the invention.

FIG. 3a depicts a histogram illustrating an exemplary distribution of path powers of second (-strongest) paths 2 and third (-strongest) paths 3 of a delay profile of a UMTS transmission observed in the field. The distribution is plotted for values of the signal power of the second path 2 and the third path 3. A strongest first path which is used as reference path, for example, is not illustrated in FIG. 3a. The second path 2 has a (probability) distribution of 0.2%, 2%, 5%, 11%, 27%, 33%, 16%, 4%, 1%, 0.5%, and 0.1% for assuming powers of −14 dB, −13 dB, −12 dB, −11 dB, −10 dB, −9 dB, −8 dB, −7 dB, −6 dB, −5 dB, and −4 dB. The third path 3 has a (probability) distribution of 3%, 23%, 27%, 18%, 8%, 3%, 1%, 0.3%, 0.1%, 0.05%, and 0.01% for assuming powers of −14 dB, −13 dB, −12 dB, −11 dB, −10 dB, −9 dB, −8 dB, −7 dB, −6 dB, −5 dB, and −4 dB.

FIG. 3b depicts a histogram illustrating an exemplary distribution of time delays of second paths 2 and third paths 3 of the delay profile illustrated in FIG. 3a. The distribution is plotted for values of the time delay of the second path 2 and the third path 3. A strongest first path which is used as reference path is not illustrated in FIG. 3b. The second path 2 has a (probability) distribution of 0.05%, 0.1%, 7.5%, 2%, 30%, 58%, 2.3%, 0.05% and 0.01% for assuming time delays of 0, 1, 2, 3, 4, 5, 6, 7, 8 in units of a half chip (Tc/2). The third path 3 has a (probability) distribution of 0.05%, 0.01%, 32.5%, 3%, 5.5%, 3.5%, 27.5%, 27% and 0.1% for assuming time delays of 0, 1, 2, 3, 4, 5, 6, 7, 8 in units of a half chip (Tc/2).

It is obvious from the histogram of FIG. 3b that most of the second paths 2 and third paths 3 have a time delay of 2 to 7 times the half chip length Tc/2. By evaluating the histogram of FIG. 3a one learns that most of the second paths 2 and third paths 3 have a path power between −14 dB and −5 dB. The threshold 114 as pre-determined in FIG. 2 with a first threshold value 11 of −9 dB, for example, in the first section 21 ranging from delays of 0 ns to 781 ns (3Tc) and a second threshold value 12 of −13 dB, for example, in the second section 22 for higher delays than 3 Tc is an adequate choice for detecting second paths 2 and third paths 3 in the field.

Figure 4:
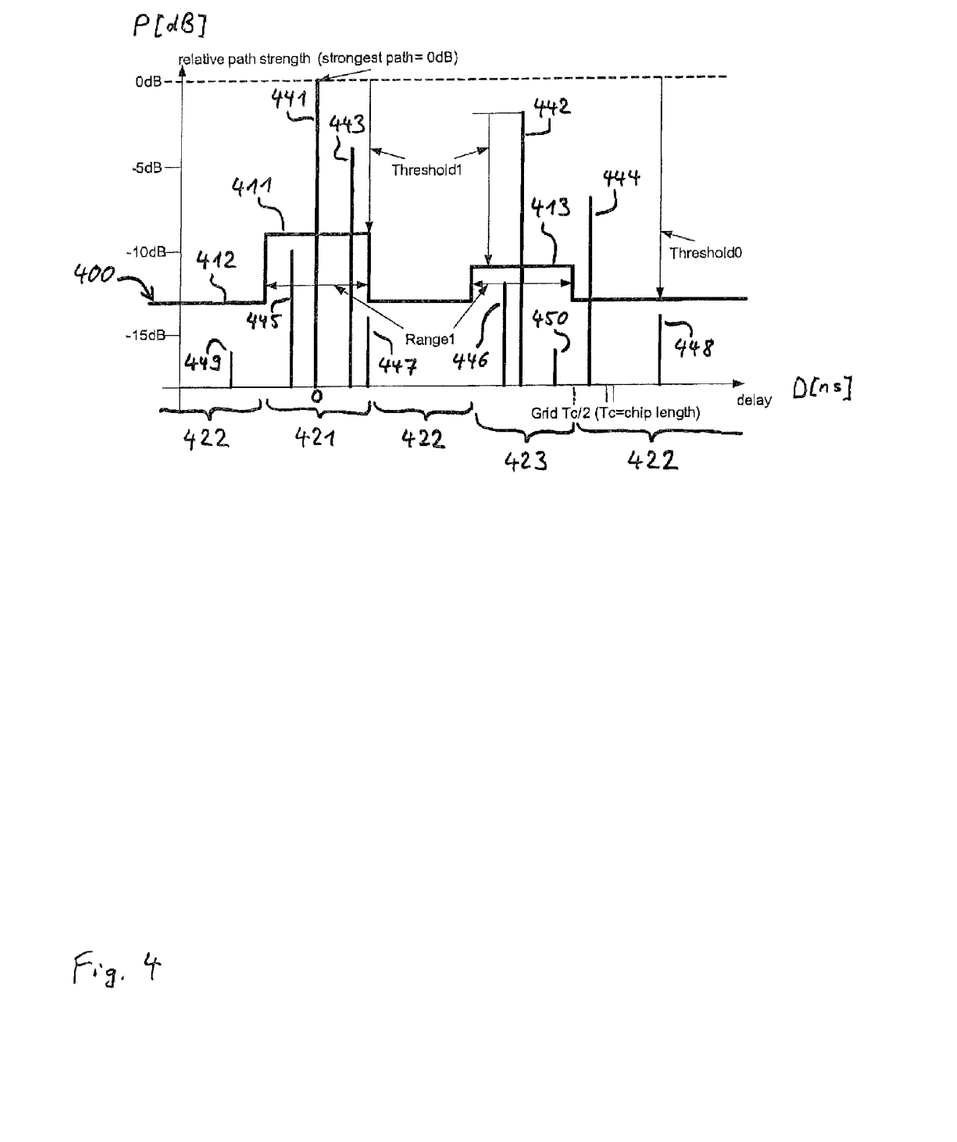
FIG. 4 schematically illustrates a threshold of a device according to one embodiment.

FIG. 4 schematically illustrates a threshold of a device according to one embodiment. FIG. 4 depicts an exemplary delay profile illustrating relative signal powers P of multi-paths measured in decibels versus time delay D measured in ns or in chip lengths Tc. The half chip length Tc/2 is depicted by a grid element on the delay-axis D. The delay profile has a strongest path 441, a second-strongest path 442, a third-strongest path 443, a fourth-strongest path 444 and six weaker paths 445, 446, 447, 448, 449 and 450.

A device according to one embodiment includes a delay profile estimator to estimate the delay profile as depicted in FIG. 4 and a path selector to select paths from the delay profile by using the threshold 400 as depicted in FIG. 4. Paths are selected if a signal power of a respective path is higher than a threshold value of the threshold 400. The signal power of path 441, which has the strongest signal power and is thus selected as the (first) reference path, is normalized to 0 dB. The further paths 442 to 450 have signal powers in descending order of −2 dB, −4 dB, −7 dB, −10 dB, −12 dB, −14 dB, −14 dB, −16 dB, and −16 dB.

In one embodiment the threshold 400 contains three sections 421, 422 and 423 in which the threshold has different threshold values. In a first section 421 which is arranged around the reference path 441 the threshold 400 has a first threshold value 411 which is −9 dB. In a second section 422 which is contiguous to the first section 421 and contiguous to a third section 423 the threshold 400 has a second threshold value 412 which is −13 dB. In the third section 423 which is arranged around the second-strongest path 442 which is selected as a second reference path the threshold 400 has a third threshold value 413 which is −11 dB. While the first section 421 is symmetrically located within a range of "Range1" around the first reference path 441 and the third section 423 is symmetrically located within a range of "Range1" around the second reference path 442 the remaining sections of the time delay D axis are used for the second section 422, such that the second section 422 serves as a base threshold having the second threshold value 412 of −13 dB.

In the embodiment illustrated in FIG. 4 the length "Range1" of the first section 421 is equal to the length "Range1" of the third section 423 and both sections are symmetrically arranged around the first reference path 441 and the second reference path 442, respectively. Other embodiments have different lengths of the first section 421 and the third section 423. Only one of the sections 421, 423 or none of both sections 421, 423 may be arranged symmetrically around the corresponding reference path. The first 411 and the third 413 threshold value may be different as depicted in FIG. 4 or they may be equal in height.

FIG. 4 depicts the case of both threshold values 411 and 413 being different in height. The first threshold value 411 is set to the difference of the signal power of first reference path 441 (which is normalized as 0 dB) and a pre-determined "Threshold1" value (which is 9 dB). The same pre-determined "Threshold1" value is used for determining the third threshold value 413 in one embodiment. The third threshold value 413 is set to the difference of the signal power of second reference path 442 and the "Threshold1" value. The second threshold value 412 is set to the difference of the signal power of first reference path 441 and a pre-determined "Threshold0" value (which is 13 dB). This second threshold value 412 serves as a base threshold, such that none of the threshold values is below the base threshold in one embodiment.

If the second path 442 has a lower signal power and the difference between its signal power and the "Threshold1" value is equal or below the second threshold value 412, the third threshold value 413 would be set equal to the second threshold value 412. This is the case for the third path 443 having a signal power of −4 dB resulting in a difference of −4 dB−9 dB=−13 dB which is equal to the second threshold value 412 (−13 dB) and this is also the case for the fourth path 444 having a signal power of −7 dB resulting in a difference of −7 dB−9 dB=−16 dB which is smaller than the second threshold value 412 (−13 dB) and is thus set to −13 dB.

In the diagram of FIG. 4 two threshold values 411 and 413 are depicted which are different from the second threshold value 412 of the base threshold 412. The signal powers of the weaker paths 443 to 450 are not strong enough to overcome the "Threshold1" value. According to another embodiment the number of threshold values which are different from the second threshold value (the base threshold value) may be pre-determined. This may, for example, be the case when a user wants to adjust the number of multi-paths to be processed in a subsequent Rake receiver. The user may select the corresponding threshold values such that the pre-determined number of multi-paths may pass the path selector and that artifacts or interferences in time delay sections around the selected multi-paths are suppressed by the path selector. The user may select the same threshold value for all paths or may use a signal power dependent selection for the threshold value associated with the section around each multi-path.

In one embodiment the first 421 and third 423 sections may not be separated by the second section 422 (not shown in FIG. 4). In this case first 421 and third 423 sections may merge to a single section having a single threshold value which may be the first 411 or the third 413 threshold value or a combination of both threshold values, e.g. the sum or the maximum of both threshold values. Alternatively, the range where both sections 421, 423 overlap may be the combination of both threshold values 411, 413, e.g. the addition or the maximum of both values. The threshold values of the portions of the sections 421, 423, which do not overlap, may not change, i.e. the non-overlapping portion of the first section 421 has the first threshold value 411 and the non-overlapping portion of the third section 423 has the third threshold value 413.

By applying the threshold 400 to the delay profile depicted in FIG. 4 the path selector selects the paths 441, 442, 443 and 444, the signal power of which is above the threshold 400 and suppresses the remaining paths 445 to 450 the signal power of which is below the threshold 400. These remaining paths 445 to 450 are assigned to artifacts and interferences (445, 446, 450) originating from independent strong paths (441, 442) or noisy paths (447, 448, 449) which shall not be used for further processing.

The values of 9 dB for "Threshold1" value and 13 dB for the "Threshold0" value are appropriate values which were derived from evaluation of field tests as depicted in FIGS. 3*a* and 3*b*. By the same evaluation the length of "Range1" of first 421 and third 423 section was determined to be six times Tc, with Tc being the chip length. Needless to say that different values for "Threshold1", "Threshold0" and "Range1" values may be determined for other embodiments which may be appropriate for other field tests or evaluation processes.

The embodiment illustrated in FIG. 4 leads to high noise margins of selected multi-paths and also rejects interference paths originating from the independent multi-paths by setting different threshold values for different path delays. Beside the base threshold "Threshold0" of 13 dB a different threshold "Threshold1" is used around the strong path 441 within the distance of Range1/2. Appropriate values with respect to the statistics of the field tests depicted in FIGS. 3*a* and 3*b* could be, for example, Threshold1=9 dB and Range1=6 Tc=12 Tc/2.

With the exemplary value of Range1=6 Tc impacts on "Case 1" 3GPP tests, which delay profile is listed above in Table 1 and depicted in FIG. 2, may also be avoided. As the weak and second path 201 for the "Case 1" test is at 976 ns (3.75 Tc), i.e. outside of the window of Threshold1, the additional Threshold1 has no impact on the performance of the 3GPP test. For the second path 201 only the usual Threshold0 of 13 dB is applied. To pass the 3GPP performance requirements the second path of −10 dB at 976 ns need not be rejected. Its distance to the first strong path 200 (0 dB/976 ns=3.75 Tc) is large enough not to be influenced by it. Other 3GPP reference channel scenarios like the "Case 3" test contain paths 202, 203, 204 (−3 dB/260 ns, −6 dB/521 ns, −9 dB/781 ns) closer to the strongest path 200. But these are strong enough to be above the Threshold1, if Threshold1 is configured correctly, e.g. as 9 dB as depicted in FIG. 4. Therefore, also the impact on these channels is minimized. The parameters Threshold0, Threshold1 and Range1 can be flexibly tuned to fit the requirements of the field and the 3GPP tests.

According to one embodiment, the Threshold1 may be set relative to the strongest path (reference path 441 as depicted in FIG. 4) or relative to another path being set as a reference path. Only one threshold value 411 or 413 may be different from the second threshold value 412 or a multiple number of threshold values 411, 413 etc. may be different from the second threshold value 412. Their heights (threshold values) may be set to the signal power of one path set as reference path minus Threshold1. According to one embodiment Threshold1 may be set relative to all paths wherein a path the signal power of which falls below Threshold0 is not selected by the path selector.

According to one embodiment, the threshold 400 is evaluated cell-wise, wherein the expression "cell" describes the range of a mobile communications base station. A UMTS receiver, for example, may demodulate radio signals arriving from six different cells and may evaluate their delay profiles. The path selector of the UMTS receiver according to an embodiment may determine a combined threshold from the six delay profiles or evaluate each of the six delay profiles individually.

The thresholds 400 may depend on the general quality, e.g. the quality of the cells, the signal-to-noise ratio Ec/Io or other cell characteristic parameters. Thresholds 400 may depend on the path power, e.g. different thresholds may be selected for the strongest path 441 and the other paths 442 to 450. Thresholds 400 may be adjusted by evaluation of histograms as depicted in FIGS. 3*a* and 3*b* or they may be adjusted by an adaptive process on-line. This can be achieved, for example, by a measurement of the signal powers of different multi-paths and a successive adaptive adjustment of the thresholds by a selection criterion. The selection criterion may be to identify strong and weak paths and weight relative signal powers and relative time delays of the weak paths with respect to the strong paths allowing an assignment of a path to an independent multi-path or to an artifact or interference path originating from one of the strong paths.

The thresholds 400 may have overlapping sections 421 and 423 of threshold values 411 and 413 different from the second (base) threshold value 412. According to one embodiment only the largest threshold value is used, i.e. the first threshold value 411. In case of multi-overlapping where more than two sections overlap on the delay axis and thereby form an overlapping section only the largest threshold value of these multiple threshold values contributing to the overlapping section is used for forming the threshold 400.

For a UMTS device including a path selector with a threshold 400 according to the embodiment depicted in FIG. 4 one can program radio channels in a test environment with path profiles, which show differences in finger rejection thresholds 411, 413 by a different performance, for example relating to signal-to-noise ratio. In the example with a Threshold1 of 9 dB and Threshold0 of 13 dB, this could be the comparison of the BLER (Block Error Rate) performance with AWGN (Additive White Gaussian Noise) and a main path with 0 dB (position 0) and one additional path at −10 dB (and other amplitudes) at varying positions. From a different performance for different positions of the additional path, one can conclude on the finger placing/rejection mechanism.

Figure 5:
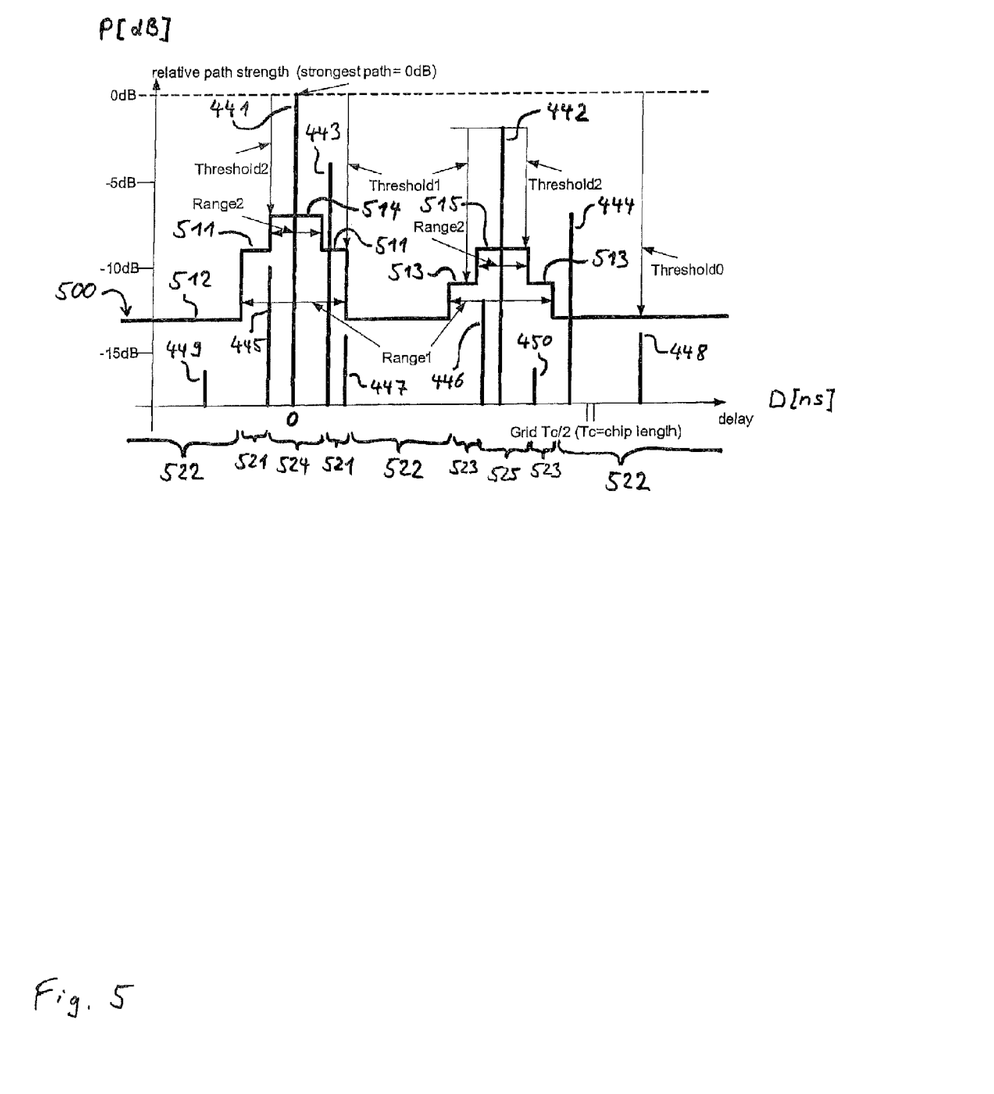
FIG. 5 schematically illustrates a threshold of a device according to one embodiment.

FIG. 5 schematically illustrates a threshold of a device according to one embodiment. FIG. 5 depicts an exemplary delay profile which corresponds to the delay profile illustrated in FIG. 4 having a strongest path 441, a second-strongest path 442, a third-strongest path 443, a fourth-strongest path 444 and six weaker paths 445, 446, 447, 448, 449 and 450.

A device according to one embodiment includes a delay profile estimator which estimates the delay profile as depicted in FIG. 5 and contains a path selector to select paths from the delay profile by using the threshold 500 as depicted in FIG. 5. Paths are selected if the signal power of a respective path is higher than the respective threshold value of the threshold 500.

The threshold 500 contains five sections 521, 522, 523, 524 and 525 in which the threshold 500 has different threshold values. In a first section 521 having two discontiguous parts which are arranged around the reference path 441 the threshold 500 has a first threshold value 511 which is −9 dB. In a second section 522 which is contiguous to the first section 521 and contiguous to a third section 523 the threshold 500 has a second threshold value 512 which is −13 dB. In the third section 523 having two discontiguous parts which are arranged around the second-strongest path 442, which is selected as a second reference path, the threshold 500 has a third threshold value 513 which is −11 dB. In a fourth section 524 which is symmetrically arranged around the first reference path 441 and contiguous to the two parts of the first section 521 the threshold 500 has a fourth threshold value 514 which is −7 dB. In a fifth section 525 which is symmetrically arranged around the second reference path 442 and contiguous to the two parts of the third section 523 the threshold 500 has a fifth threshold value 515 which is −9 dB.

When comparing FIGS. 4 and 5, it is obvious that the first section 421 of FIG. 4 is replaced in FIG. 5 by the first section 521 and the fourth section 524. Moreover, the first threshold value 511 of FIG. 5 corresponds to the first threshold value 411 of FIG. 4 and the fourth threshold value 514 represents an additional threshold value. The third section 423 of FIG. 4 corresponds to the third section 523 and the fifth section 525 of FIG. 5, wherein the third threshold value 513 of FIG. 5 corresponds to the third threshold value 413 of FIG. 4 and the fifth threshold value 515 represents an additional threshold value. The second section 422 with the second threshold value 412 of FIG. 4 corresponds to the second section 522 with the second threshold value 512 of FIG. 5 forming a base threshold value.

The fourth section 524 is symmetrically arranged within a range of "Range2" around the first reference path 441, and the fifth section 525 is symmetrically arranged within a range of "Range2" around the second reference path 442. The combination of first section 521 and fourth section 524 is symmetrically arranged within a range of "Range1" around the first reference path 441 and the combination of third section 523 and fifth section 525 is symmetrically arranged within a range of "Range1" around the second reference path 442. Remaining sections of the time delay axis D are occupied by the second section 522 with the second threshold value 512 of −13 dB.

In FIG. 5 the length "Range1" of the combination of first section 521 and fourth section 524 is equal to the length "Range1" of the combination of third section 523 and fifth section 525, and both combined sections are symmetrically arranged around the first reference path 441 and the second reference path 442, respectively. Also the length "Range2" of fourth section 524 is equal to the length "Range2" of the fifth section 525, and both sections are symmetrically arranged around the first reference path 441 and the second reference path 442, respectively.

Other embodiments have different lengths of first section 521, third section 523, fourth section 524 and fifth section 525. Only one of both combined sections 521/524, 523/525 or none of the combined sections 521/524, 523/525 may be arranged symmetrically around the corresponding reference path. Only one of both sections 524, 525 or none of the sections 524, 525 may be arranged symmetrically around the corresponding reference path. Only one of both sections 521, 523 or none of the sections 521, 523 may be arranged symmetrically around the corresponding reference path. The two parts of the first section 521 may be arranged symmetrically around the first reference path 441 while the fourth section 524 may be arranged asymmetrically around the first reference path 441. The two parts of the third section 523 may be arranged symmetrically around the second reference path 442 while the fifth section 525 may be arranged asymmetrically around the second reference path 442.

The first 511, third 513, fourth 514 and fifth 515 threshold values may be different or two, three or all of them may be equal in height. In FIG. 5 the first threshold value 511 is equal to the fifth threshold value 515 while the other threshold values 512, 513 and 514 are different.

FIG. 5 depicts the case of first threshold value 511 and third threshold value 513 being different in height and of fourth threshold value 514 and fifth threshold value 515 being different in height. The first threshold value 511 is set to the difference of the signal power of first reference path 441 (which is normalized as 0 dB) and a pre-determined "Threshold1" value (which is 9 dB). The same pre-determined "Threshold1" value is applied for determining the difference of the signal power of second reference path 442 and the "Threshold1" value to result in the third threshold value 513. The fourth threshold value 514 is set to the difference of the signal power of first reference path 441 and a pre-determined "Threshold2" value (which is 7 dB). The same pre-determined "Threshold2" value is applied for determining the difference of the signal power of second reference path 442 and the "Threshold2" value to result in the fifth threshold value 515. The second threshold value 512 is set to the difference of the signal power of first reference path 441 and a pre-determined "Threshold0" value (which is 13 dB). This second threshold value 512 serves as a base threshold, such that none of the threshold values is below the base threshold.

If the second path 442 has a lower signal power and the difference between its signal power and the "Threshold1" value would be equal or below the second threshold value 512 the third threshold value 513 would be set equal to the second threshold value 512. This is the case for the third path 443 having a signal power of −4 dB resulting in a difference of −4 dB−9 dB=−13 dB which is equal to the second threshold value 512 (−13 dB) and this is also the case for the fourth path 444 having a signal power of −7 dB resulting in a difference of −7 dB−9 dB=−16 dB which is smaller than the second threshold value 512 (−13 dB) and is thus set to −13 dB.

If the second path 442 has a lower signal power and the difference between its signal power and the "Threshold2" value would be equal or below the third threshold value 513, the fifth threshold value 515 would be set equal to the third threshold value 513. If the first path 441 has a lower signal power and the difference between its signal power and the "Threshold2" value would be equal or below the first threshold value 511, the fourth threshold value 514 would be set equal to the first threshold value 511.

The combined first 521 and fourth 524 section may not be separated from the combined third 523 and fifth 525 section by the second section 522 (not shown in FIG. 5). In this case combined first 521 and fourth 524 section and combined third 523 and fifth 525 section may merge to a single section having a single threshold value which may be the first 511, third 513, fourth 514 or fifth 515 threshold value or a combination of these threshold values, e.g. an addition or a maximum of these threshold values. Alternatively, the range where sections 521, 523, 524, 525 or parts thereof overlap may be a combination of their threshold values 511, 513, 514, 515, e.g. the addition or the maximum of these values while the section of non-overlapping have their respective threshold values, i.e. first threshold value 511 for non-overlapping first section 521, third threshold value 513 for non-overlapping third section 523, fourth threshold value 514 for non-overlapping fourth section 524 and fifth threshold value 515 for non-overlapping fifth section 525.

By applying the threshold 500 to the delay profile depicted in FIG. 5 the path selector selects the paths 441, 442, 443 and 444 the signal power of which is above the threshold 500 and suppresses the remaining paths 445 to 450 the signal power of which is below the threshold 500. These remaining paths 445 to 450 are assigned to artifacts and interferences (445, 446, 450) originating from independent strong paths (441, 442) or noisy paths (447, 448, 449) which shall not be used for further processing.

The values of 9 dB for "Threshold1" value, 7 dB for "Threshold2" value and 13 dB for the "Threshold0" value are suitable values which were derived from evaluation of field tests as depicted in FIGS. 3a and 3b in one embodiment. By the same evaluation the length of "Range1" was determined to be six times Tc and the length of "Range2" was determined to be three times Tc, with Tc being the chip length. Needless to say that different values for "Threshold1", "Threshold2", "Threshold0", "Range1" and "Range2" values may be determined for other embodiments which may be suitable for other field tests.

With the exemplary value Range1=6 Tc and Range2=3 Tc impacts on "Case 1" 3GPP tests which delay profile is listed above in Table 1 and depicted in FIG. 2 may be avoided. A discrimination between independent multi-paths to be selected by the path selector and unwanted interference paths may be improved by using the threshold 500. This threshold 500 emulates the form of an interference distribution around the strong paths. Close to the strong paths a probability of a path being an interference path is high while far away from the strong paths the probability of a path being an interference path is low. By using more than the five sections with threshold values depicted in FIG. 5 different shapes of the threshold 500 can be emulated. According to one embodiment, the shape of the threshold 500 can be adapted to a known or measured interference distribution or to a theoretical interference distribution, for example a sin(x)/x or another window function.

Figure 6:
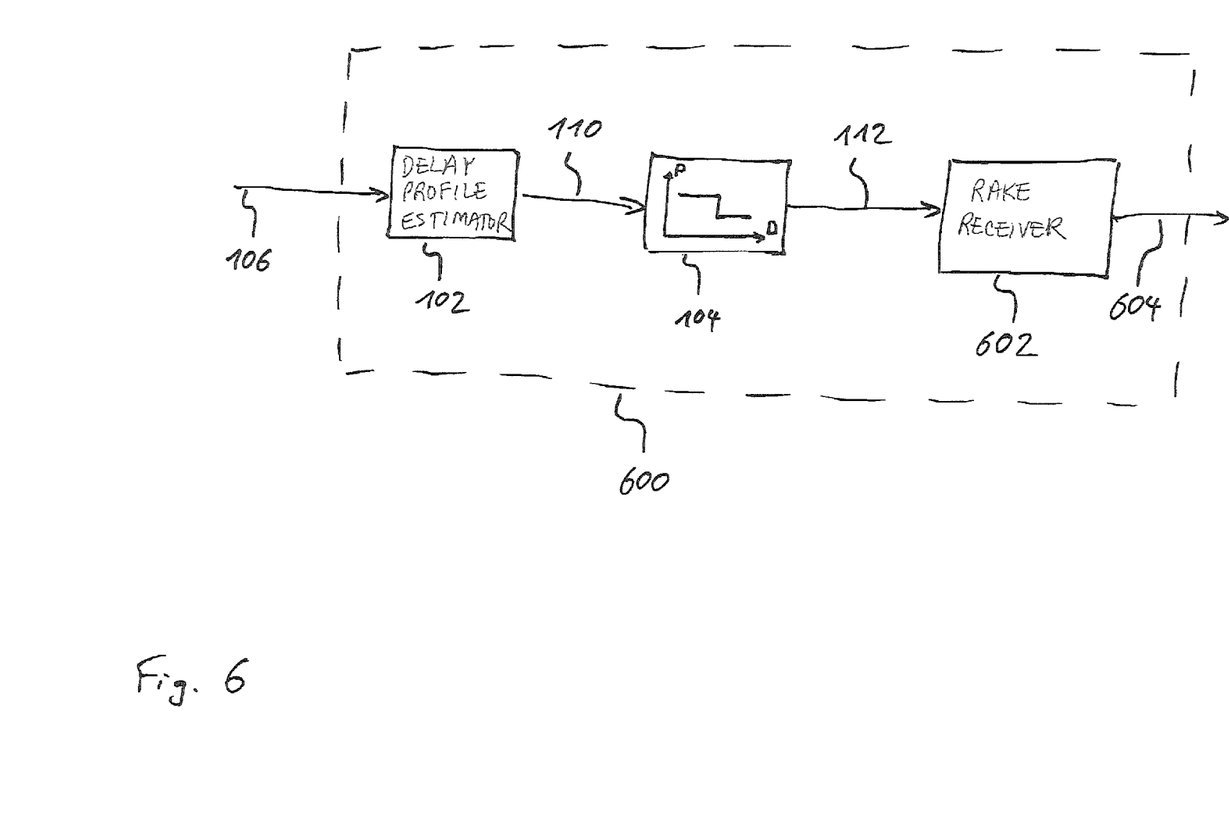
FIG. 6 schematically illustrates a CDMA receiver according to one embodiment.

FIG. 6 schematically illustrates a CDMA radio receiver according to one embodiment. The CDMA radio receiver 600 includes a delay profile estimator 102, a path selector 104 and a rake receiver 602. The delay profile estimator 102 and the path selector 104 correspond to the respective devices 102 and 104 of FIG. 1 described above.

The path selector 104 selects one or more paths from the estimated delay profile 110 estimated by the delay profile estimator 102 by using a threshold and provides a selected delay profile 112 containing selected signal powers P of the radio signal 106 versus time delay D to the rake receiver 602. The threshold may correspond to one of the thresholds 114, 400 and 500 depicted in FIGS. 1, 2, 4 and 5. The selected delay profile 112 may also be stored as a table or a list or in another appropriate representation.

The Rake receiver 602 is connected to the path selector 104 and receives the selected delay profile 112 provided by the path selector 104. The radio signal 106 received by the CDMA radio receiver 600 may be a CDMA radio signal which is coded using a Code Division Multiple Access (CDMA) technique.

A CDMA technique is used in W-CDMA systems of the third mobile radio generation for example, particularly in UMTS, as a multiple access method. In CDMA a plurality of subscribers occupy the same frequency band but the radio signal is coded differently for or by each subscriber. The different CDMA coding provides for subscriber separation by using subscriber-specific CDMA spreading codes impressed on each data symbol. The elements of the CDMA spreading code sequence are the above-identified chips, the symbol period being a multiple of the chip period.

The Rake receiver 602 contains a plurality of so-called rake fingers, one rake finger being allocated to one multi-path of the received delay profile 112 corresponding to one selected transmission path and thus to one received signal version. In each rake finger the received signal is despread with the spreading code at the chip clock rate. In this process the received signal or as an alternative the spreading code is individually displaced in time for each rake finger in accordance with the delay of the transmission path selected by the path selector 104 allocated to the rake finger. The despread signals of the individual rake fingers are weighted by a maximum ratio combiner (MRC) at the symbol rate in accordance with the attenuation of the transmission path and superimposed. The superimposed signal 604 is provided by the rake receiver 602 at an output terminal of the CDMA radio receiver 600. The gain resulting from the superposition of the signals of the rake fingers is the multi-path diversity gain.

By receiving the selected delay profile 112 instead of the estimated delay profile 110 the rake receiver 602 processes reliable rake fingers. Rake fingers are assigned to those path components which have the highest power components regarding independent multi-paths. No rake fingers are assigned to interferences or artifacts originating from strong paths. Thus, an optimal proportion of signal power of the received CDMA radio signal 106 is distributed over a plurality of independent multi-path components and superimposed in the maximum ratio combiner. Rake fingers are only allocated to those path components which power is higher than the noise level and higher than the interference level.

The pre-selection of non-noisy and non-interfered multipaths by the path selector 104 of the CDMA radio receiver 600 allows the rake receiver 602 to process path components free of (statistical) noise and interference noise, thus avoiding impairment of the multi-path diversity gain at the output of the CDMA radio receiver 600. The bit error rate (BER) at the output of the CDMA radio receiver 600 which is a quality measure for the quality of the CDMA radio receiver 600 is thus improved compared to a conventional CDMA receiver. By limiting the number of multi-paths offered to the rake receiver 602 a computational complexity of the rake receiver 602 can be optimized as the number of parallel processing paths is reduced. Additionally, or alternatively, a rake receiver 602 having a restricted number of fingers may process other multi-paths, e.g. paths having a higher time delay or a lower signal power, by the vacant finger processing resources in order to improve the accuracy of the multi-path diversity gain.

A method for estimating a delay profile of a radio signal and selecting a path therefrom includes estimating a delay profile of multiple paths of a radio signal, wherein the delay profile indicates signal powers of the multiple paths as a function of time delay. The method further includes selecting a path from the delay profile if the path has a signal power higher than a threshold. The threshold has a first threshold value in a first section of the delay profile which is higher than a second threshold value in a second section of the delay profile. The first and second sections are time delay sections. The first section of the delay profile may be arranged symmetrically around a first reference path.

In addition, while a particular feature or aspect of an embodiment of the invention may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it should be understood that embodiments of the invention may be implemented in discrete circuits, partially integrated circuits or fully integrated circuits or programming means. Also, the terms "exemplary", "for example" and "e.g." are merely meant as an example, rather than the best or optimal. It is also to be appreciated that features and/or elements depicted herein are illustrated with particular dimensions relative to one another for purposes of simplicity and ease of understanding, and that actual dimensions may differ substantially from that illustrated herein.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A device, comprising:
    a delay profile estimator configured to estimate a delay profile of multiple paths of a radio signal, the delay profile indicating signal powers of the multiple paths as a function of time delay; and
    a path selector configured to select a path from the delay profile if the path has a signal power higher than a threshold,
    wherein the threshold comprises a first power threshold value which is valid in a first section of the delay profile and a second power threshold value which is valid in a second section of the delay profile, wherein the first power threshold value is greater than the second power threshold value,
    wherein the first section of the delay profile is valid for a first range of time delay values, and the second section of the delay profile is valid for a second range of time delay values different from the first range of time delay values, and wherein the first range of time delay and the second range of time delay do not overlap with respect to time delay, and
    wherein the second power threshold value is based on a signal power of a path having a largest signal power in the first section of the delay profile.

2. The device of claim 1, wherein the first section of the delay profile is arranged around a first reference path of the delay profile.

3. The device of claim 2, wherein the first section of the delay profile is arranged symmetrically around the first reference path.

4. The device of claim 3, wherein the second section of the delay profile is contiguous to the first section of the delay profile.

5. The device of claim 1, wherein the first power threshold value is constant within the first section of the delay profile.

6. The device of claim 1, wherein the first section of the delay profile has a time length that is greater than a chip time length.

7. The device of claim 6, wherein the length of the first section of the delay profile is between two and ten times the chip time length.

8. The device of claim 1, wherein the first power threshold value depends on at least one of a signal-to-noise ratio and a quality measure of one cell of a base station.

9. The device of claim 1, wherein the threshold further comprises a third power threshold value in a third section of the delay profile which third threshold value is higher than the second power threshold value.

10. The device of claim 9, wherein the third section of the delay profile is arranged around a second reference path.

11. The device of claim 9, wherein the third power threshold value is independent of the first power threshold value.

12. The device of claim 10, wherein the first power threshold value depends on the signal power of the first reference path and the third power threshold value depends on a signal power of the second reference path.

13. A device, comprising:
    a delay profile estimator configured to estimate a delay profile of multiple paths of a radio signal, the delay profile indicating signal powers of the multiple paths as a function of time delay; and
    a path selector configured to select a path from the delay profile if the path has a signal power higher than a threshold,
    wherein the threshold comprises a first power threshold value in a first section of the delay profile and a second power threshold value in a second section of the delay profile, wherein the first power threshold value is greater than the second power threshold value,
    wherein the threshold further comprises a third power threshold value in a third section of the delay profile which third power threshold value is higher than the second power threshold value, and wherein the third section is overlapping the first section, thereby forming an overlapping section and a power threshold value of the overlapping section is the largest of the first power threshold value and the third power threshold value.

14. The device of claim 9, wherein the third section of the delay profile has the same length as the first section.

15. A device, comprising:
a delay profile estimator configured to estimate a delay profile of multiple paths of a radio signal, the delay profile indicating signal powers of the multiple paths as a function of time delay; and
a path selector configured to select a path from the delay profile if the path has a signal power higher than a threshold,
wherein the threshold comprises a first power threshold value in a first section of the delay profile and a second power threshold value in a second section of the delay profile, wherein the first power threshold value is greater than the second power threshold value,
wherein the threshold further comprises a third power threshold value in a third section of the delay profile which third power threshold value is higher than the second power threshold value,
wherein the third section of the delay profile is arranged around a second reference path, and
wherein the third power threshold value is set such that a difference between a signal power of the second reference path and the third power threshold value is equal to a difference between a signal power of the first reference path and the first power threshold value.

16. A device, comprising:
a delay profile estimator configured to estimate a delay profile of multiple paths of a radio signal, the delay profile indicating signal powers of the multiple paths as a function of time delay; and
a path selector configured to select a path from the delay profile if the path has a signal power higher than a threshold,
wherein the threshold comprises a first power threshold value which is valid in a first section of the delay profile and a second power threshold value which is valid in a second section of the delay profile, wherein the first power threshold value is greater than the second power threshold value,
wherein the first section of the delay profile is valid for a first range of time delay values, and the second section of the delay profile is valid for a second range of time delay values different from the first range of time delay values, and wherein the first range of time delay and the second range of time delay do not overlap with respect to time delay,
wherein the threshold further comprises a third power threshold value in a third section of the delay profile which third threshold value is higher than the second power threshold value,
wherein the third section of the delay profile is arranged around a second reference path, and
wherein the threshold further comprises a fourth power threshold value in a fourth section of the delay profile that is arranged within the first section symmetrically around the first reference path, wherein the fourth power threshold value is higher than the first power threshold value.

17. The device of claim 16, wherein the threshold further comprises a fifth power threshold value in a fifth section of the delay profile that is arranged within the third section symmetrically around the second reference path, wherein the fifth power threshold value is higher than the third power threshold value.

18. The device of claim 17, wherein the fifth power threshold value is set such that a difference between a signal power of the second reference path and the fifth power threshold value is equal to a difference between a signal power of the first reference path and the fourth power threshold value if the fifth power threshold value is above the third power threshold value, otherwise the fifth power threshold value is equal to the third power threshold value.

19. The device of claim 17, wherein a length of the first section and a length of the third section of the delay profile is about six times a chip length, and wherein a length of the fourth section and a length of the fifth section of the delay profile is about three times a chip length.

20. A method, comprising:
estimating a delay profile of multiple paths of a radio signal, the delay profile indicating signal powers of the multiple paths as a function of time delay; and
selecting a path from the delay profile if the path has a signal power higher than a threshold,
wherein the threshold has a first power threshold value which is valid in a first section of the delay profile and a second power threshold value which is valid in a second section of the delay profile, wherein the first power threshold value is greater than the second power threshold value,
wherein the first section of the delay profile is valid for a first range of time delay values, and the second section of the delay profile is valid for a second range of time delay values different from the first range of time delay values, and wherein the first range of time delay and the second range of time delay do not overlap with respect to time delay, and
wherein the second power threshold value is based on a signal power of a path having a largest signal power in the first section of the delay profile.

21. The method of claim 20, wherein the first section of the delay profile is arranged symmetrically around a first reference path of the delay profile.

22. The device of claim 21, wherein the threshold further comprises a third power threshold value in a third section of the delay profile arranged around a second reference path, wherein the third power threshold value is greater than the second power threshold value.

23. A receiver, comprising:
a delay profile estimator configured to estimate a delay profile of multiple paths of a radio signal, the delay profile indicating signal powers of the multiple paths as a function of time delay;
a path selector configured to select paths from the delay profile if the paths have signal powers greater than a threshold; and
a rake receiver assigning rake fingers to the paths selected by the path selector,
wherein the threshold comprises a first power threshold value that is constant and valid in a first time delay section of the delay profile arranged symmetrically around a first reference path, and a second power threshold value that is constant and valid in a second time delay section of the delay profile, wherein the first power threshold value is greater than the second power threshold value, and wherein the second time delay section is contiguous to the first time delay section, and wherein the first time delay section has a time length greater than a time length of a chip, wherein the first section of the delay profile is valid for a first range of time delay values, and the second section of the delay profile is valid for a second range of time delay values different from the first range of time delay values, and wherein the first range of time delay and the second range of time delay do not overlap with respect to time delay, and wherein the second power threshold value is based on a signal power of a path having a largest signal power in the first section of the delay profile.

24. A receiver, comprising:

a delay profile estimator configured to estimate a delay profile of multiple paths of a radio signal, the delay profile indicating signal powers of the multiple paths as a function of time delay;

a path selector configured to select paths from the delay profile if the paths have signal powers greater than a threshold; and a rake receiver assigning rake fingers to the paths selected by the path selector, wherein the threshold comprises a first power threshold value that is constant in a first time delay section of the delay profile arranged symmetrically around a first reference path, and a second power threshold value that is constant in a second time delay section of the delay profile, wherein the first power threshold value is greater than the second power threshold value, and wherein the second time delay section is contiguous to the first time delay section, and wherein the first time delay section has a time length greater than a time length of a chip, and wherein the threshold further comprises a third power threshold value in a third time delay section of the delay profile, wherein the third time delay section is arranged around a second reference path, and wherein the third power threshold value is set such that a difference between a signal power of the second reference path and the third power threshold value is equal to a difference between a signal power of the first reference path and the first power threshold value.

25. The device of claim 1, wherein the power threshold value is exclusively valid for the first range of time delay values, and the second power threshold value is exclusively valid for the second range of time delay values different from the first range of time delay values.

* * * * *